US00RE35357E

United States Patent [19]

Browne

[11] E Patent Number: Re. 35,357

[45] Reissued Date of Patent: Oct. 22, 1996

[54] DISPLAY ELEMENT WITH NOTCHED DISK

[75] Inventor: John Browne, Oakville, Canada

[73] Assignee: Mark IV Industries, Ltd., Mississauga, Canada

[21] Appl. No.: 885,654

[22] Filed: May 19, 1992

Related U.S. Patent Documents

Reissue of:

[64] Patent No.: 5,055,832
Issued: Oct. 8, 1991
Appl. No.: 385,453
Filed: Jul. 27, 1989

U.S. Applications:

[63] Continuation-in-part of Ser. No. 363,698, Jun. 9, 1989, abandoned.

[51] Int. Cl.[6] ..... G09G 3/34

[52] U.S. Cl. ..... 345/84; 345/110; 40/447

[58] Field of Search ..... 340/764, 763, 340/783, 815.05, 815.24, 815.26; 40/447, 449, 451, 492, 452; 345/84, 86, 110, 111

[56] References Cited

U.S. PATENT DOCUMENTS

| | | |
|---|---|---|
| 1,577,427 | 3/1926 | Browne . |
| 3,975,728 | 8/1976 | Winrow . |
| 4,577,427 | 3/1986 | Browne . |
| 4,794,391 | 12/1988 | Costa et al. . |
| 4,833,306 | 5/1989 | Gars . |
| 4,860,470 | 8/1989 | Browne . |
| 4,974,353 | 12/1990 | Norfolk et al. . |
| 5,022,171 | 6/1991 | Norfolk et al. . |

FOREIGN PATENT DOCUMENTS

| | | |
|---|---|---|
| 0054336 | 6/1982 | European Pat. Off. . |
| 0109328 | 5/1984 | European Pat. Off. . |
| 0210913 | 2/1987 | European Pat. Off. . |
| 2533342 | 3/1984 | France . |
| 2586129 | 2/1987 | France . |
| WO85/02478 | 6/1985 | WIPO . |

*Primary Examiner*—Richard Hjerpe
*Assistant Examiner*—Chanh Nguyen
*Attorney, Agent, or Firm*—Darby & Darby, P.C.

[57] ABSTRACT

A rotor presents bright and dark sides of a flat disk to a viewer. When the bright side is presented this side plus a stationary panel form a bright viewing area. When the dark side is presented the panel is occluded. The edges of the panel and of the disk in ON position define an aperture for light emission from an optic fibre end.

23 Claims, 5 Drawing Sheets

FIG. 8.
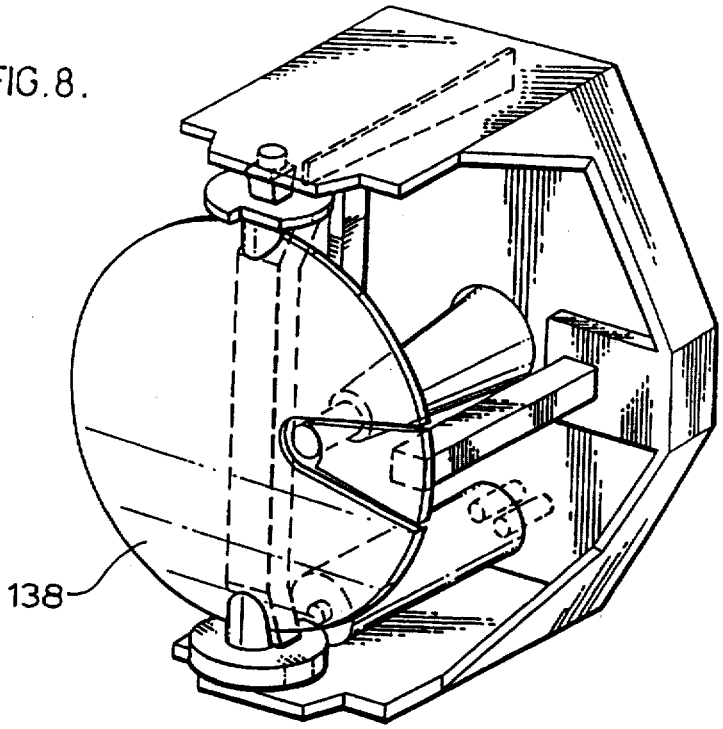
FIG. 9.
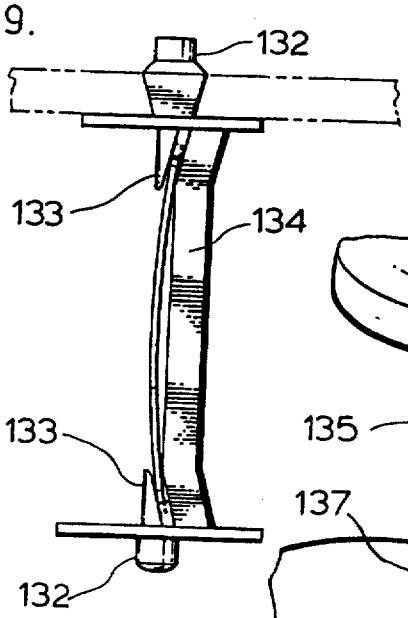
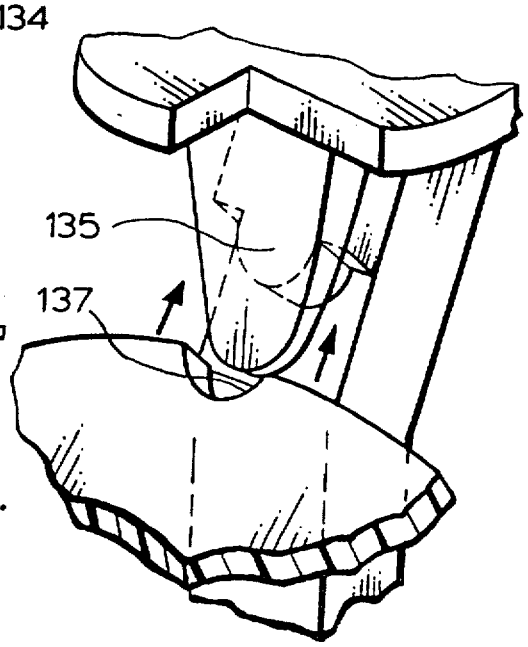
FIG. 10.

DISPLAY ELEMENT WITH NOTCHED DISK

Matter enclosed in heavy brackets [ ] appears in the original patent but forms no part of this reissue specification; matter printed in italics indicates the additions made by reissue.

This application is a continuation-in-part of application 07/363,698 filed Jun. 9, 1989, now abandoned.

This invention relates to a display device of a type which is principally designed to be used in an array to collectively produce indicia or designs. However the display of the invention may be used individually as a binary indicator.

'Forward' herein is from the device toward the viewer and 'rearward' is in the opposite direction.

The type of display device with which the invention is concerned provides a pattern area for viewing from viewing locations whose locus is a cone with its apex at the pattern area. The cone need not be a surface of revolution although it usually will be. The subject display device will be adapted to display a brighter or darker pattern area to the viewing location in ON and OFF positions respectively. The surface providing the brighter pattern area will be visible due to reflected ambient light. In addition the pattern area will be adapted to allow the light from a light source or optic fibre to supplement the reflected ambient light.

Such a device is disclosed in European Patent Application 86 401 583.9 filed Jul. 16, 1986 Publication number 0,210,913. (application "'913" hereafter). In application '913 a electromagnetically driven disk rotates on its diameter to display a brighter or a darker side. An optic fibre end is placed behind the disk which is apertured so that in its 'ON' attitude the light from the fibre shines through the disk to augment the effect of the reflected ambient light; while in the 'OFF' attitude of the disk the disk or an appendage thereof masks the fibre to viewers. A disadvantage of the apertured disk was that, if near 180° rotation was used, the fibre must be at least the radius of the disk rearward of it meaning that the cone of light from the disk was very small or the aperture must be too large reducing the disk's ambient light reflectant area. If substantially less than 180° rotation was used special appendages to the disk had to be provided to mask the fibre to the viewer in the OFF position.

In accord with one aspect of this invention a driven rotor or disk rotating about its axis through 180° or nearly 180° between OFF and ON position displays respectively darker and lighter sides to viewing locations. The rotor is a generally flat, thin plate which may be of circular or other shape. The thin rotor can be considered as defining a median plane and the rotary axis is approximately parallel and close to such plane. The rotor is designed to be divided into two portions by the rotary axis, which is intermediate opposed edges of the disk, so that in rotation between ON and OFF positions one portion rotates away from and the other portion rotates toward the viewing locations. In the ON position when viewed from a viewing location the brighter side of the disk combines with a panel on the stator to occupy together the pattern area visible to the viewer. The panel and disk in ON position are substantially edge to edge to viewers in a viewing location and, in ON position, are shaped to define between their adjacent edges an aperture for the passage of light from a source, preferably an optic fibre. The stator and rotor are designed so that the rotor may rotate from ON to OFF with its aperture-proximate edge passing rearward of the axis without interfering with the source and so that a portion of the darker side of the disk will mask the source in the OFF position. Since the aperture-proximate side of the disk may pass rearwardly between ON and OFF positions, the fibre end may be placed as close to the median plane of the disk in ON position as required and thus the fibre may be located as close behind the aperture as desired allowing the combination of as wide a cone of light from the fibre as desired with a relatively small 'aperture'. The 'aperture' herein being defined by two edge-to-edge members as hereinafter defined.

In a preferred embodiment of this one embodiment of the invention the rotor is provided with a notch extending inwardly from a side (relative to the rotary axis) edge in the portion of the disk which is adjacent the panel in the ON position. The notch extends and preferably tapers toward the rotary axis and approaches but stops short of the axis. The stator provides a panel acting, when viewed from a viewing location, to nearly fill the notch and complete the pattern area with the rotor in ON position, (to a viewer at the viewing location) with the exception of an area defining an aperture at the inner end of the notch. A source, preferably an optic fibre end, is located just rearward of the rotor in ON position to shine through the aperture. The fibre may thus be located relatively close to the centre of the pattern area to give an almost symmetrical impression to the viewer. However, since the aperture is on one side of the rotary axis, it will be covered when the rotor is rotated 180° (or almost 180°). Moreover the forward end of the fibre may be placed just rearward of the plane of the rotor in ON position since the rotor notch side passes on the side of the rotor axis remote from the viewer between ON and OFF positions.

In another aspect of the invention, the disk with notch, as described in the previous paragraph, is used without the provision of a stator panel. The notched disk is rotatably supported on and forwardly of a mounting means to rotate; about an axis which is intermediate opposite edges of the disk, and which is near and substantially parallel to the median plane: between ON and OFF limiting positions, to display bright and dark sides respectively, to the viewing locations, and is provided with means for so rotating said disk, between ON and OFF positions; wherein an optic fibre is provided extending forwardly on a narrow support from said mounting means to a light emitting end, directed toward said viewing locations, located just rearwardly of said disk and on one side of said axis in the ON position. The notch is shaped to expose the fibre end to the viewing locations in the ON position and is shaped to allow the notched portion of the disk to pass the narrow support in rotating between ON and OFF positions. The disk is shaped to mask the fibre optic end to the viewing locations in the OFF position.

There is thus provided a notched disk rotatable through 180° or nearly 180°, as hereinafter described, displaying to the viewer its bright side in the ON position with the fibre end shining through the notch. The fibre thus, to some extent, acts (in an array) as a pixel of its own but also attracts the attention of the viewer and causes him to concentrate on the information provided by an array, considering the bright disk side, or this bright side plus the fibre end, as the pixel. In its 'alerting and concentrating' role the invention here described may be designed so that the fibre end is visible to a narrower cone of viewing locations than the bright disk face on its own. (This is of considerable value for use of the invention in an array used to provide information to driven on a highway, to first attract the motorist's attention by means of the fibre ends and then convey information through the combined bright side-fibre end pixels, arranged in an array. (For clarity in reading the application and claims herein the 'cone of viewing locations' refers to the narrower cone from which the fibre end can be seen, if narrower than that for the 'bright side' array as a whole.)

The disk is designed when rotated 180° or near to 180° to OFF position to obscure the fibre end to the viewers at viewing locations.

The notch is shaped to allow the notched portion of the disk to pass the narrow fibre support in rotating between ON and OFF positions.

This could perhaps be better put by saying that the notch must be profiled to pass the fibre and support in rotating between ON and OFF positions.

Thus this aspect of the invention includes the alternative where no matching bright side stator panel fills the notch in the ON position and it will be found that the degradation in the effect of the bright side portion of the disk due to the notch is in many cases negligible.

The invention, considered from this point of view, may preferably, of course, have the stator panel previously discussed.

In all forms of the notch the geometry of the notch and of the rotor and stator as a whole, are such as to allow the rotor to turn between ON and OFF positions with its notched edge away from the viewer.

In drawings which illustrate a preferred embodiment of the invention.

Figure 4:
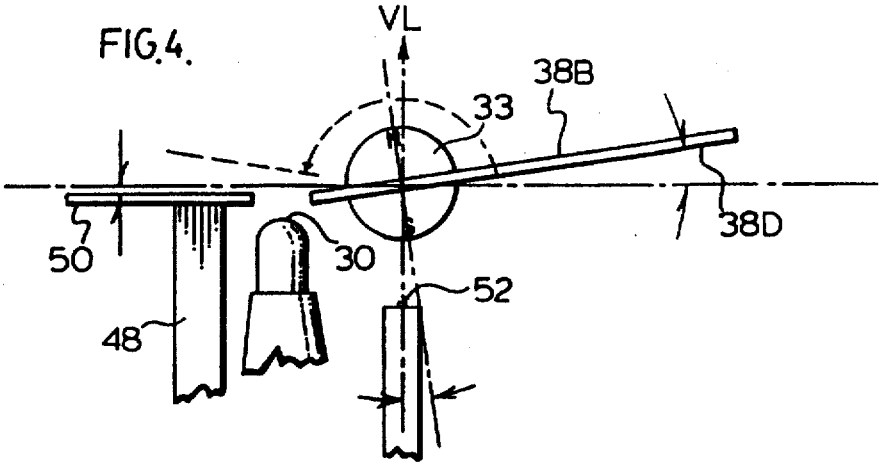
Figure 5:
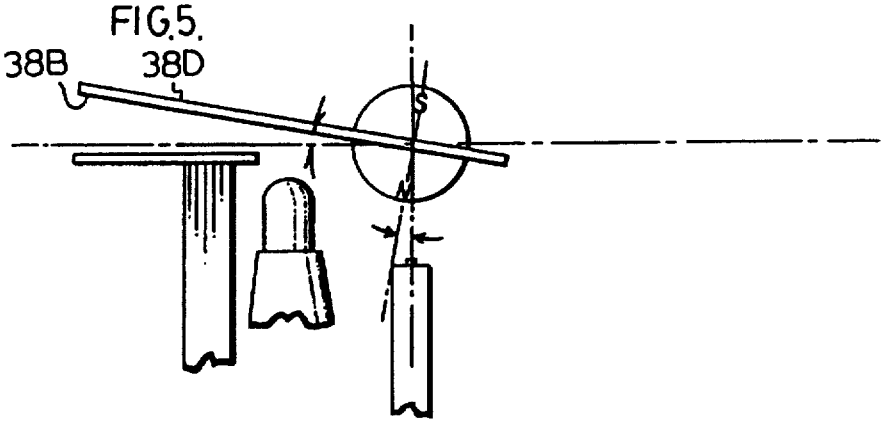

FIGS. 4 and 5 indicate the characteristics of one type of electromagnetic drive, for a device.

Figure 6:
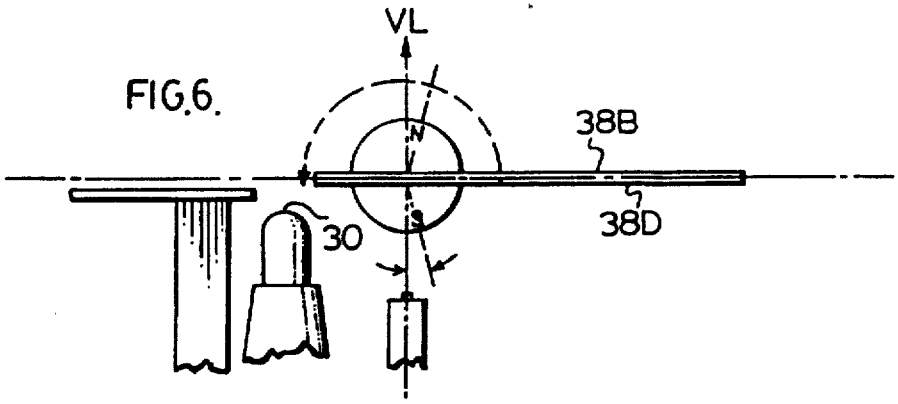
Figure 7:
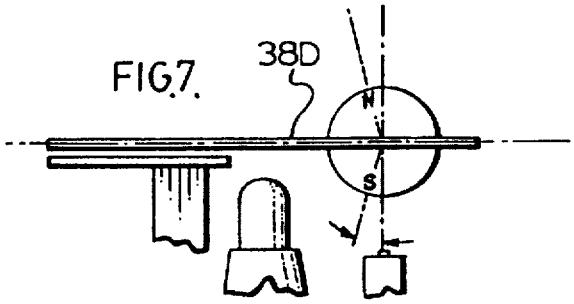

FIGS. 6 and 7 show an alternative to the drive of FIGS. 4 and 5.

FIG. 8 is a perspective view showing an alternate disk construction.

FIG. 9 is a sectional view of the disk of FIG. 8 along the rotor axis and perpendicular to the median plane of the disk.

FIG. 10 is a detailed view of a part of the disk of FIG. 8.

Figure 1:
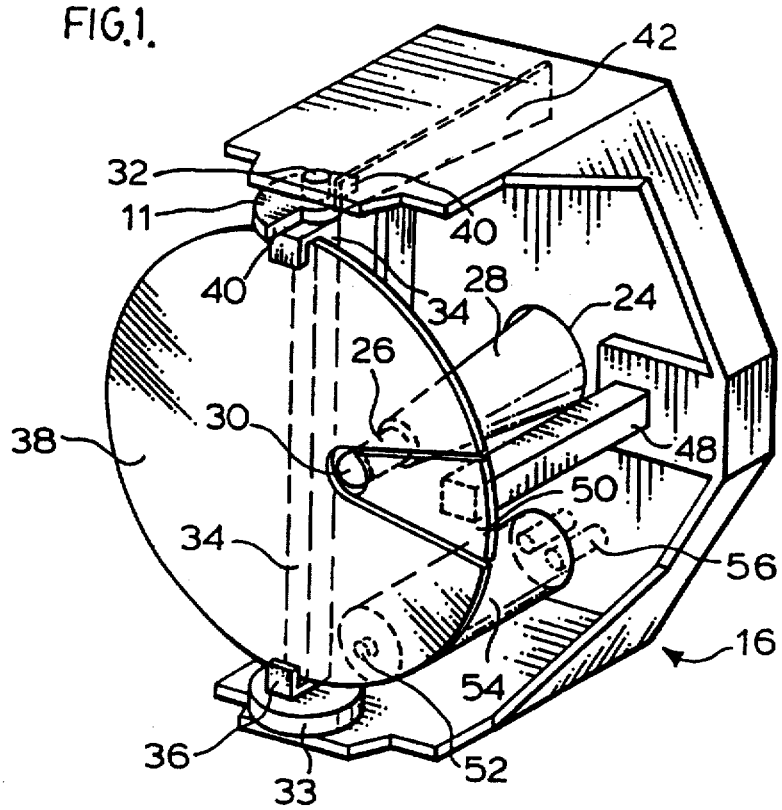
FIG. 1 is a perspective view of a display device.
Figure 3:
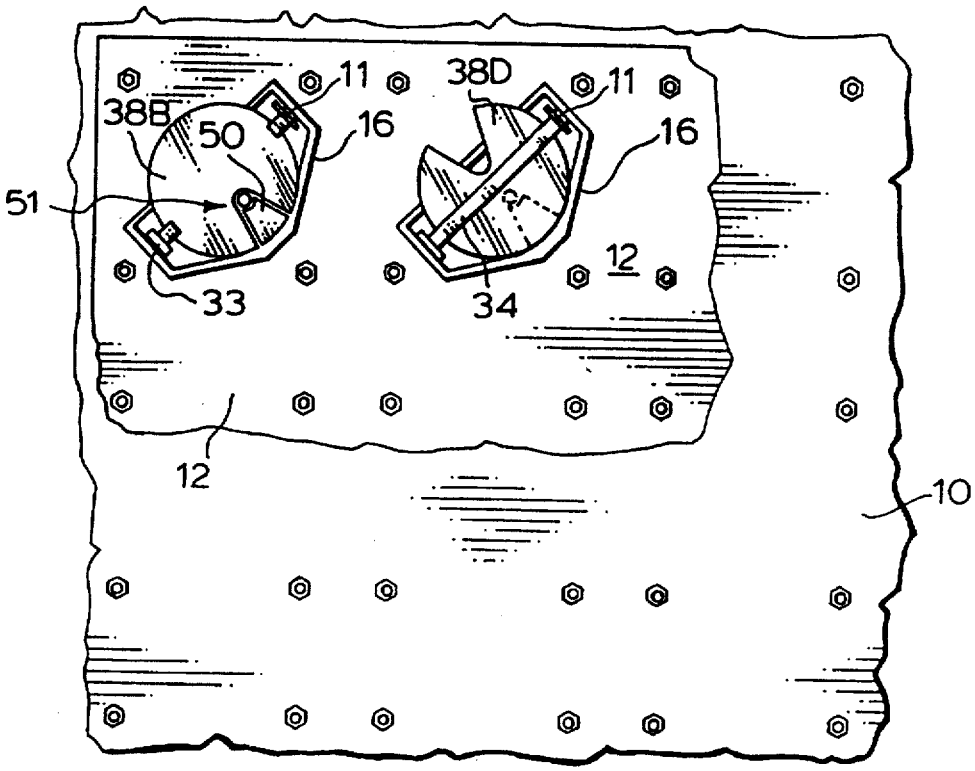
FIG. 3 is a partial view of a part of an array showing a device with the rotor in ON and a device with the rotor in OFF position.
Figure 2:
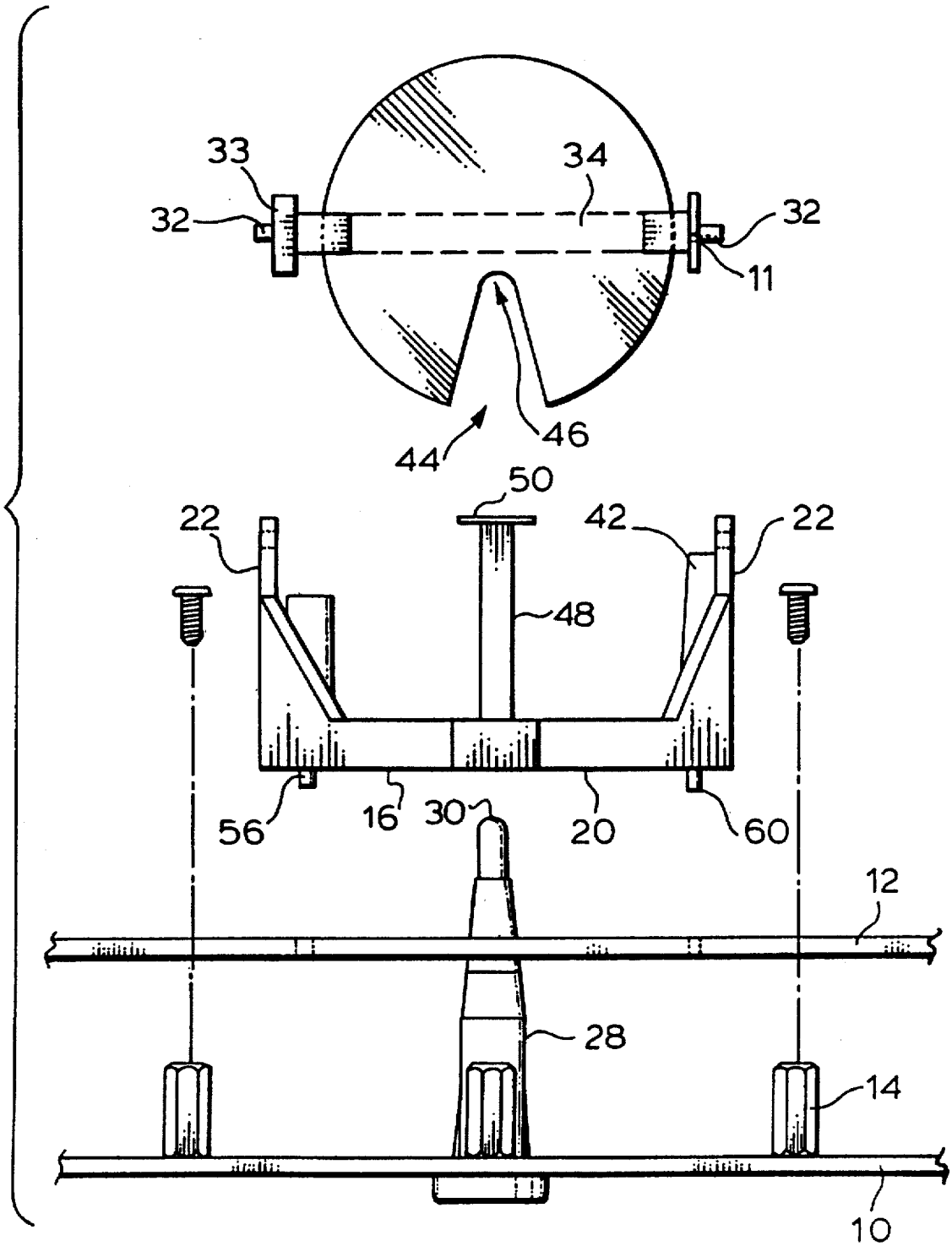
FIG. 2 is an exploded view of the display element of FIG. 1 and the mounting board and base board for an array of such elements.
Figure 11:
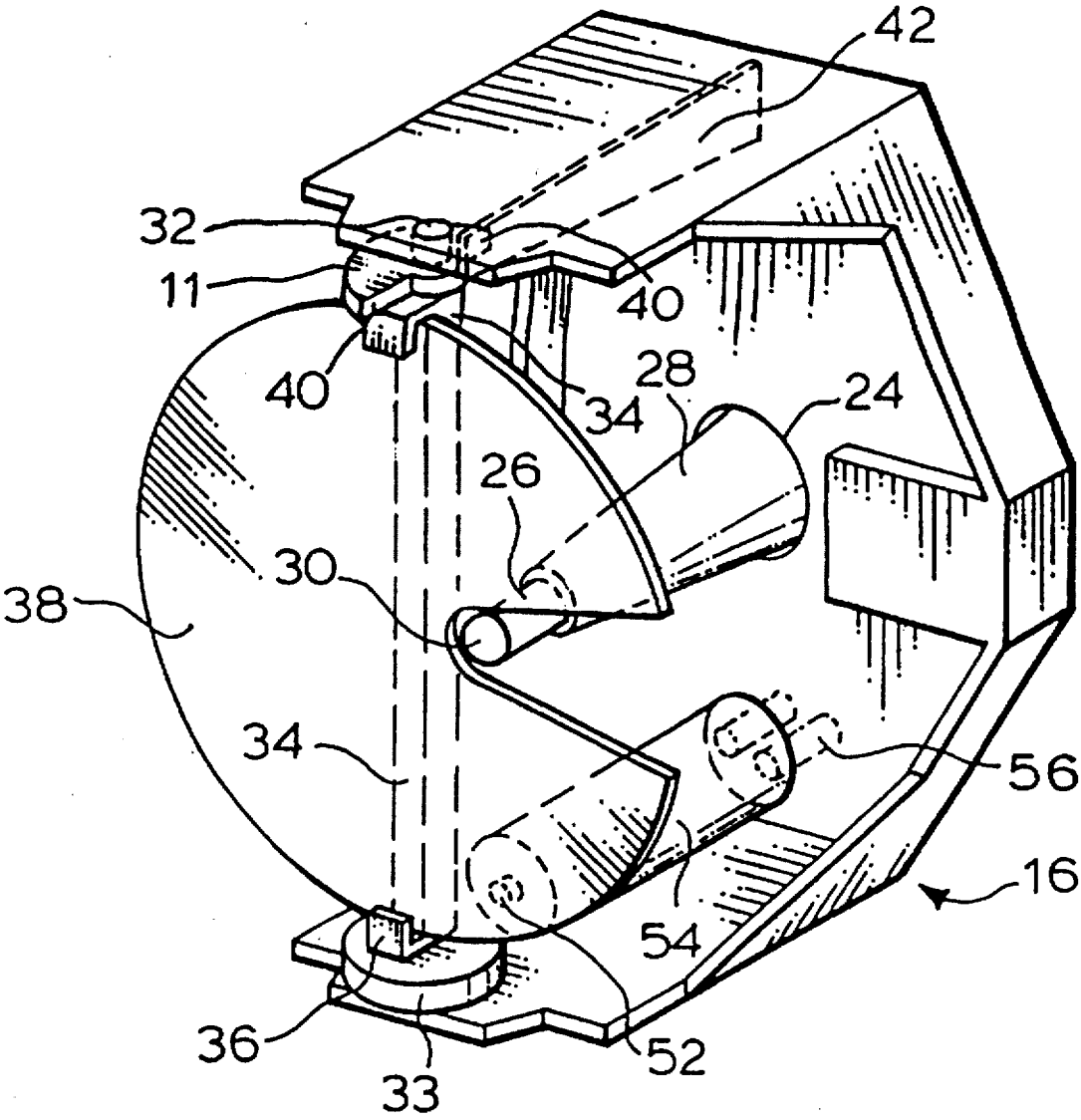

FIG. 11 is a perspective view corresponding to FIG. 1 but omitting the bright (ON) side - matching stator panel and its support.

In the drawings, a base board 10 supports a mounting board 12 on mounts 14. In practice, mounting board 12 will be the printed circuit board for operating the array. Both base board and mounting board are preferably the size of a 7×5 array of display devices in accord with the invention. The fibre optic for each display element is mounted on the base board and is illuminated at a light source, not shown. For use in an array for informing motorists on the highway the fibre optic end will terminate in a lens 30 giving a cone of light of about 15° included angle. For other than highway use a wider angle may be desirable. Mounted on the mounting board by any conventional means is a bracket 16 having a base plate 20 and end brackets 22. The base plate 20 is provided with an aperture 24 just to one side of the line joining the centres of end brackets 22 to allow projection therethrough of the optic fibre 26 and its mount pillar 28. Optic fibre 26 normally terminates in lens 30 defining an included angle in the general direction of the viewing location. Each bracket is apertured to receive the pivot pins 32 of the rotor. The rotor comprises elongated body 34 on which the pivot pins 32 are mounted and body 34 provides a platform with opposed raised end members 36 which are undercut by opposed slots to receive the diametrically opposed edges of a resilient disk which is a flat circular plate 38 which is bent and allowed to straighten into place in the slots. The geometry of the rotor and bracket are arranged to provide that the median plane of the disk is on or near the rotor axis of rotation as defined by the pins 32. On one of pins 32 is mounted a cylindrical permanent magnet 33 for rotation with the disk. The magnet 33, preferably a thin cylinder centered on the axis of rotation is provided magnetized transverse to the median plane of the flat disk, The disk 38, preferably resilient and preferably mounted as shown, may be made of plastic but plastic tends to deteriorate at some higher (otherwise acceptable) ambient temperatures. Thus it is preferable to make it of aluminum. The disk is brightly colored on side 38B and darkly on side 38D to match the bracket and background. At the end of the disk remote from the magnet, is a semi-circular stop member 11 provided with (approximately) diametrically opposed stop edges 44. The bracket is shaped to provide blade 42 having opposed faces to be contacted by edges 44, to limit rotor rotation to 180° or just less as hereinafter explained and provide ON and OFF limiting positions where the faces of the disk are facing or nearly facing the viewing locations. The disk is provided in its portion on one side of the rotary axis with a tapering notch 44 ending at radiused apex 46 the radius defining part of the edge for the aperture for the lens. The notch is directed inwardly from an edge on one side of the rotary axis and preferably generally perpendicular thereto. The entire notch including the radiused aperture must be in the disk portion on one side of the rotary axis.

A pillar 48 forming part of bracket supports a panel 50 shaped to appear to viewers at viewing locations within a cone about line VL as complementing the notch 44 in the ON position of the disk, to provide a circular pattern area for the viewers except that the inward end of panel 50 is shaped for form a continuation of the edge of apex 46 to define for the viewer an aperture 51. Adjacent edges of disk and panel allow just enough clearance to allow rotation of the notched portion of the rotor past the panel when rotating between ON and OFF positions to match the bright side 38B of the disk and contrast with the bracket and board. The panel 50 is shaped to define with the radiused notch the aperture 51 for the fibre lens 30 which, as shown in FIGS. 4 and 5 has its end Just rearward of the panel 50. The rotor stops are designed to stop the disk in ON position (with panel complementing the notch to the viewer) as shown in FIG. 4 or 6 just forwardly of the panel or to stop the disk in OFF position with the disk occluding lens 30 and panel to a viewer at a viewing location, as shown in FIGS. 5 or 7.

Thus the disk is coloured brighter to match the panel on its ON side 38B (as displayed to the viewer in the attitude of FIG. 4 or 6) and darker to match the bracket and board on its OFF side 38D as displayed to the viewer in the attitude of FIG. 5 or 7.

The notch must be profiled so that the notched portion of the disk may pass fibre 26, pillar 28 and lens 30 in rotating between ON and OFF positions.

The rotor may be electromagnetically driven between ON and OFF positions in any desired manner and with the magnet shown or another. Preferably the magnet shown is driven by a high remanence core 52 with surrounding actuating coil 54 surrounding it, and the coil has terminal pins 56 shown schematically and soldered to connections shown, ON the printer circuit board 12. The opposite end of the bracket is connected and aligned by locator pin 60 in a complementary socket preferably designed to snap into the circuit board and the bracket 20 may be fastened to board 12 by any suitable means when the coil pins are soldered to the board 12.

Two modes of driving the disk are shown. As shown in FIGS. 1 to 5 the rotor magnet 33 is magnetized diametrically perpendicular to the disk median plane. The core 52 is directed toward the magnet 33. The stop edges- 4 and blade 42 are arranged to stop the magnet 15° from alignment with the core in each limiting position. The 15° offset will not disturb the viewer and the panel 50 is shaped to complete the circle for the viewer with this offset in mind. With the 15° offset the magnet 33 is driven in the desired direction (always with its notched side rearward of the pivot axis) between ON and OFF positions. The rotor and stator are (in both embodiments) shaped to allow this rotation and the notch 44 is shaped to pass pillar 28 and lens 30 during such rotation. Pulsing the coil thus sets the core to cause rotation of the disk in either direction between ON and OFF positions. The pulsing may take much less time than the rotation of the disk since the high remanence core retains its polarization while the disk is completing its mechanical movement and will between pulses retain the disk in either limiting position.

In FIGS. 6 and 7 an alternative drive arrangement is shown. The permanent magnet is magnetized along a chord, each pole being about 15° from the diameter perpendicular to the media plane. The disk is now allowed to rotate through 180°, and 15° magnetic offset of the proximate pole of the permanent magnet in each of the ON and OFF positions providing sufficient starting torque.

For maintenance the printed circuit board 12 and the devices attached to it forming the whole array may together be detached from the base board 10 with each aperture 24 riding over the pillar 28 and fibre 26 so that the corresponding fibre array is not disturbed. Replacement as the opposite of detachment of one or more display elements without disturbing the fibre alignment.

In operation, in the 'ON' disk orientation of FIGS. 4 or 6 (ON position) the bright side 64 of the disk and the wedge 50 provide a circular bright pattern area to a viewer at a viewing location (usually on a cone about line VL). The bright appearance of the pattern area to the viewer produced by the reflection of ambient light from side 38B of the disk is augmented by the light from lens 30 shining through the aperture. In the OFF disk orientation of FIGS. 5 and 7 the dark side 38D of the disk is displayed to the viewer and the printed circuit board appearing about the disk and through its notch is correspondingly dark. Moreover the disk has now occluded lens 30 and panel to the viewer. Thus in the OFF position there is a dark area in the array corresponding to what was bright pattern area in the ON position.

Since the lens is placed as close as practically convenient to the rotation axis the light of the lens is almost symmetrical with the pattern area in the ON position. The viewing locations considered as within a 30° cone of all the dish of the array considered collectively are substantially coextensive with the viewing locations considered as within a 30° cone of all the lenses of the array considered collectively.

The panel and the bright side of the disk are preferably covered with a bright fluorescent coating for best reflection and retransmission of the ambient light.

The pattern area in the embodiment shown is circular. The pattern area could equally will be square, rectangular, hexagonal, etc. with the disk correspondingly shaped and the notch provided to be completed in ON position to a viewer by a bright stator panel. The notch may be variously shaped to rotate past the lens, pillar and fibre and to be complemented by the panel which may be otherwise than a typical wedge. The notch and panel shaping must conform to the design requirement that the assembly of rotor disk, stator (including pillar and panel) must be such that the disk may rotate with its notched side away from the viewer between ON and OFF position.

The cylindrical magnet may be replaced by a bar magnet mounted to rotate with the rotor with poles located to match the location of N and S poles in FIGS. 4 and 5 or the location of N and S poles in FIGS. 6 and 7.

FIGS. 8–10 show an alternate form of disk and rotor construction to that shown in FIGS. 1–7. The parts in FIGS. 8–10 are given similar numbers to those of the earlier FIGS. with 100 added.

Thus in FIGS. 8–10 the rotor comprises an elongate body 134 on which the pivot pins 132 are mounted and body 134 provides opposed inwardly facing slots 133 which each slope slightly upwardly in the inward direction. The root of each slots 133 is provided with an inwardly directed convexity 135 (FIG. 9) to key to complimentarily shaped notches 137 in opposite edges of the disk 138. The disk 138 is preferably formed of aluminum which is resilient and notched as before. The disk is bowed slightly for insertion in the slots and keys to the convexities 135 while flexing against the slot edges to be retained securely, but removably in place. The bowing of the disk is exaggerated for purposes of illustration in FIG. 9 and is still considered 'generally flat' as the term is used herein and still defines a median plane; and does not affect the impression of the viewing area on the viewer in ON or OFF attitude. In place of the convexity 133 and notch 135 other keying means between the disk and the groove root may be provided.

To install the disk 138 it is trust bowed sufficiently to pass under the outer slot defining edges and then allowed to expand into the slot with the concavities 135 fitting about the convexities 133. In all respects other than those discussed above the rotor operates as does that of FIGS. 1–7. The magnets, stops and electromagnetic drive are the same and either the drive of FIGS. 4 and 5 or the drive of FIGS. 6 and 7 may be used.

FIG. 11 shows an alternate construction identical to that of FIG. 1 except that panel 50 and its support pillar 48 are omitted. Operation is as described in connection with FIGS. 1–10; either the drive of FIG. 4 and 5 or the drive of FIG. 6 and 7 may be used: and the disk construction and mounting of FIG. 8 (without panel and pillar), FIG. 9 and FIG. 10 may be used.

Thus the alternative of FIG. 11 is used on the assumption that, for many applications, the degradation to the bright side disk appearance by the presence of the notch, absent the panel, makes a negligible difference in the appearance of the array. In this alternative, and considering such degradation, the designer will try to make the profile of the fibre, lens, and pillar (support) as narrow as possible to reduce the area of the notch.

I claim:

1. Display device adapted to provide a pattern area of selectively brighter or darker appearance in an ON and OFF state respectively to viewers within a cone of viewing locations, a suitor, a generally flat rotor defining a median plane said rotor rotatable on the stator between ON and OFF limiting positions about a axis parallel to said median plane and being coloured to display a brighter and a darker side to said viewing locations respectively in said ON and OFF limiting position, the rotor comprising two portions on each side of the rotary axis, a panel on said stator providing a brighter surface designed to match said rotor brighter side and located on one side of said axis and spaced therefrom, said panel surface and said rotor brighter side being designed in the ON position of said rotor to collectively occupy the pattern area to said locations, said rotor, panel and stator being shaped to allow said rotor to rotate between limiting positions with the portion of said rotor on the side of said axis nearer adjacent said panel in the ON position, moving on the side of said axis remote from the viewing locations said rotor being designed to occlude said panel to viewing locations in said OFF position and to present its darker side to said locations electromagnetic drive means for selectively causing rotation of said rotor between ON and OFF positions and selectively maintaining said rotor in either of said positions.

2. Display device as claimed in claim 1 wherein said panel and said rotor in ON position define an aperture between their edges and having a light source located to shine through said aperture.

3. Display device as claimed in claim 2 where said light source is the end of an optic fibre.

4. Display device as claimed in claim 3 wherein said rotor is provided with a notch, located in the portion adjacent said panel in the ON position of said rotor and the edge of said panel is shaped to define said aperture with an edge of said notch and said panel is otherwise shaped with the area of said aperture and the bright side of said rotor to form said pattern area in the viewing direction in the ON position of said rotor.

5. Display device as claimed in claim 4 wherein said rotor is mounted on brackets extending forwardly from a mounting board and said light source is mounted on a pillar extending forwardly of said mounting board, wherein said notch and panel are shaped so that the edges of said notch pass on each side of said pillar and source in rotor rotation between ON and OFF position.

6. Display device as claimed in claim 5 wherein said mounting board is mounted towardly of a base board wherein an array of said stators are mounted on such mounting board, and a corresponding array of light sources are mounted on pillars which in turn are mounted on said base board, and wherein said pillars project through apertures in said mounting board.

7. Display device as claimed in claim 2 wherein said rotor is provided with a notch, located in the portion adjacent said panel in the ON position of said rotor and the edge of said panel is shaped to define said aperture with an edge of said notch and said panel is otherwise shaped with the area of said aperture and the bright side of said rotor to form said pattern area in the viewing direction in the ON position of said rotor.

8. Display device as claimed in claim 7 wherein said rotor is mounted on brackets extending forwardly from a mounting board and said light source is mounted on a pillar extending forwardly of said mounting board, wherein said notch and panel are shaped so that the edges of said notch pass on each side of said pillar and source in rotor rotation between ON and OFF position.

9. Display device as claimed in claim g wherein said mounting board is mounted towardly of a base board wherein an array of said stators are mounted on such mounting board, and a corresponding array of light sources are mounted on pillars which in turn are mounted on said base board, and wherein said pillars project through apertures in said mounting board.

10. In a display device for display within a cone of viewing locations wherein a disk generally defining a median plane is rotatably mounted on and forwardly of a mounting means to rotate, about an axis intermediate opposite edges of the disk, and near and substantially parallel to the median plane, between ON and OFF limiting positions, to display bright and dark sides, respectively, to the viewing locations, and is provided with means for so rotating said disk between ON and OFF positions, the improvement comprising:

providing an optic fibre extending forwardly on a narrow support from said mounting means to a light emitting end, directed toward said viewing locations, located just rearwardly of said disk and on one side of said axis in the ON position or the disk;

said disk being shaped to define a notch extending inwardly from an edge of said disk which is located on said one side of said disk in the ON position, said notch being shaped so that its inward end is located near to the axis of the disk to register with said fibre and relatively close to the center of the disk to expose said fibre to the viewer in the ON position and to give an almost symmetrical impression to the viewer in the ON position and allows the notched portion of said disk to pass said support in rotating between ON and OFF positions;

said disk being shaped to mask said fibre optic end to the viewing locations in the OFF position.

*11. A graphic character matrix display assembly, comprising: a support providing a nonreflecting background for said display; a multiplicity of display units mounted on said support in an array for cooperatively displaying said character;*

*each of said display units comprising:*

*a flat non-apertured display element having a symmetry axis, a light reflecting side and a nonreflecting opposite side, and having a radial cutout at its periphery;*

*motive means on said support for rotating said display element substantially along the axis of symmetry of said display element between a light reflecting display position exposing said light reflective side and a reversed position exposing said nonreflecting side;*

*an illumination means carried by said support adjacent said display element and arranged to project said light beam forward of said display position through a cutout and to project an outline of said display element, when said disk is in said display position, said display element having an imperforate edge to block said light beam when said display element is in said reversed position;*

*whereby said character is displayed in ambient reflected light where certain ones of said disks are in said display position, and whereby said character is displayed in the absence of said ambient light by said projected light beams.*

*12. A graphic character matrix display assembly as claimed in claim 11, wherein said illuminating means is a lamp.*

*13. A graphic character matrix display assembly as claimed in claim 11, wherein said illuminating means is a light emitting diode.*

*14. A graphic character matrix display assembly as claimed in claim 11, wherein each of said display elements has a suitable geometric shape, and whereby said cutout is comprised of two spaced legs each extending inwardly from the periphery of said display element with their inner ends joined together for effectively passing said light beam thereinbetween when said display element is in said display position.*

*15. A graphic character matrix display assembly as claimed in claim 11, wherein said illuminating means is disposed to project said light beam upon the rear of said display element within said periphery thereof when said display element is in said reversed position to block said light beam.*

*16. A display unit for a graphic character matrix display assembly, comprising:*

*a flat non-apertured display element having a symmetry axis and light reflecting and non-reflecting opposite sides;*

*a support for rotatably mounting said display element and for providing a nonreflecting background behind said display element;*

*motive means on said support for rotating said display element substantially along the axis of symmetry of said display element between a light reflecting display position exposing said light reflecting side and a reversed position exposing said nonreflective side; and*

*a light source carried by said support and disposed adjacent said display element to project a light beam forward of said display position and to project an outline of said element, when said display element is in said display position,*

*said display element having a cutout peripheral portion arranged to transmit said light beam display element when said element is in said display position, said display element having an imperforate peripheral portion to block and conceal said light source when display clement is in said reversed position.*

*17. A display unit as claimed in claim 16, wherein said light source is a lamp.*

*18. A display unit as claimed in claim 16, wherein said light source is a light emitting diode.*

*19. A display unit for a graphic character matrix display assembly, comprising:*

*a flat non-apertured display disk having a symmetry axis and light and dark opposite sides and a peripheral radial notch;*

*a support for rotatably mounting said disk and for providing a dark background behind said disk;*

*motive means on said support for rotating said disk substantially along the axis of symmetry of said disk between a display position exposing one of said sides of said disk, and a reverse position to expose the other side of said disk;*

*a light source carried by said support and disposed adjacent said disk to project a light beam through said notch when said disk is in said display position;*

*said disk having an imperforate edge portion arranged to block said light beam and to conceal said light source when said disk is in said reverse position.*

*20. A display unit as claimed in claim 19, wherein said light source is a lamp.*

*21. A display unit as claimed in claim 19, wherein said light source is a light emitting diode.*

*22. A graphic character matrix display assembly, comprising:*

*a support providing a dark background for said display;*

*a multiplicity of display units mounted on said support in an array for cooperatively displaying said character;*

*each of said display units comprising:*

*a flat non-apertured display element having a symmetry axis, a light side and a dark opposite side, and having a radial cutout at its periphery;*

*motive means on said support for rotating said display element substantially along the axis of symmetry of said display element between a light reflecting display position exposing said light side and a reversed position exposing said dark side;*

*an illumination means carried by said support adjacent said display element and arranged to project said light beam forward of said display position through said cutout when said disk is in said display position, said display element having an imperforate edge to block said light beam when said display element is in said reversed position;* whereby said character is displayed by ambient reflected light where certain ones of said disks are in said display position, and whereby said character is displayed in the absence of said ambient light by said projected light beams.

*23. A display unit for a graphic character matrix display assembly, comprising:*

*a flat non-apertured display element having a symmetry axis and light and dark opposite sides;*

*a support for rotatably mounting said display element and for providing a dark background behind said display element;*

*motive means on said support for rotating said display element substantially along the axis of symmetry of said display element between a display position exposing said light side and a reversed position exposing said dark side; and*

*a light source carried by said support and disposed adjacent said display element to project a light beam forward of said display position when said display element is in said display position,*

*said display element having a cutout peripheral portion arranged to transmit said light beam past said display element when said element is in said display position, said display element having an imperforate peripheral portion to block and conceal said light source when said display element is in said reversed position.*

* * * * *